United States Patent [19]
Tarshiani et al.

[11] Patent Number: 5,422,046
[45] Date of Patent: Jun. 6, 1995

[54] METHOD FOR PRODUCING OPTICAL LENSES

[75] Inventors: Yassin Y. Tarshiani, Largo; Joseph Boryslawski, St. Petersburg, both of Fla.

[73] Assignee: Essilor of America, Inc.

[21] Appl. No.: 115,362

[22] Filed: Aug. 31, 1993

[51] Int. Cl.6 ............................................. B29D 11/00
[52] U.S. Cl. .................... 264/1.38; 264/40.6; 425/143; 425/174.4; 425/808
[58] Field of Search ............ 264/22, 40.6, 1.38, 264/1.4; 425/174.4, 808, 143, 144

[56] References Cited

U.S. PATENT DOCUMENTS

| | | |
|---|---|---|
| 3,945,982 | 3/1976 | Morgan . |
| 4,166,088 | 8/1979 | Neefe . |
| 4,298,005 | 11/1981 | Mutzhas . |
| 4,342,863 | 8/1982 | Hohokabe et al. . |
| 4,536,267 | 8/1982 | Ito et al. . |
| 4,728,469 | 3/1988 | Danner et al. . |
| 4,873,029 | 10/1989 | Blum . |
| 4,879,318 | 11/1989 | Lipscomb et al. . |
| 4,912,185 | 3/1990 | Toh . |
| 4,919,850 | 4/1990 | Blum et al. . |
| 4,983,335 | 1/1991 | Matsuo et al. . |
| 5,028,358 | 7/1991 | Blum . |
| 5,135,685 | 8/1992 | Masuhara et al. ................ 264/40.6 |
| 5,135,686 | 8/1992 | Masuhara et al. ................ 264/40.6 |

FOREIGN PATENT DOCUMENTS 360869 2/1989 European Pat. Off. .
3193313 12/1989 Japan .
PCT/US92/-
00327 1/1992 WIPO .

OTHER PUBLICATIONS

Abstract-Mitsubishi Petrochemical Co. Ltd. p. 11.
Abstract-Mitsubishi Gas Chem KK p. 4.

*Primary Examiner*—Mathieu D. Vargot

[57] ABSTRACT

A method for casting plastic lenses includes a step in which lens forming materials having at least one liquid monomer and at least one photosensitive initiator are injected into a mold. The lens forming materials in the mold are subjected to ultraviolet light. The mold assembly is cooled in a liquid cooling bath. The temperature of the lens forming material within the mold is monitored, and the ultraviolet light is turned off when the temperature reaches a predetermined upper set point temperature. The ultraviolet light is turned on again when the temperature falls to a predetermined lower set point temperature. The process can be performed automatically with a programmable process control, which monitors the temperature, compares the temperature to the predetermined set point temperature, and turns the ultraviolet light on and off according to the results of the comparison.

18 Claims, 2 Drawing Sheets

METHOD FOR PRODUCING OPTICAL LENSES

BACKGROUND OF THE INVENTION

1. Field of the Invention

This invention relates generally to processes for casting optical lenses, and more particularly to processes for casting plastic optical lenses.

2. Description of the Prior Art

Plastic lenses are desirable because they are lighter in weight, higher in impact resistance, and lower in manufacturing cost than comparable inorganic glass lenses. The most common monomer utilized to produce optical plastic lenses is diethylene glycol diallyl carbonate (hereinafter referred to as DAC), which is marketed by AKZO Chemicals Inc. of Dobbs Ferry, N.Y. and PPG Industries, Inc. of Pittsburgh, Pa. under the trademarks Nouryset 200 ® and CR-39 ®, respectively. DAC is widely accepted due to the clarity, strength, impact resistance, resistance to discolorization, and resistance to physical warping or distortion of products made from DAC.

According to current manufacturing processes, the DAC monomer is mixed with free-radical initiator, such as di-isopropyl peroxy dicarbonate. These lens forming materials are injected within a pair of glass mold sections that are sealed by a gasket and held together by a spring clip or other suitable fastener. The charged mold assembly is then heated in a water bath or air oven to a predetermined temperature to cure the resin.

The above described thermal curing process has several drawbacks. As an initial matter, the peroxide catalysts require extreme care in handling. Also, the plastic lenses made from DAC have a refractive index (nD) of about 1.50, which is lower than the refractive index of conventional inorganic glass lenses, the latter being about 1.523. The center thickness and edge thickness of the lenses must, therefore, be made larger than the thickness of inorganic glass lenses.

Efforts have been made to develop compositions which are capable of producing higher refractive index lenses than those currently produced by the polymerization of DAC. Such compounds were found to increase the value of the refractive index, but also required very long curing times, usually 1 to 4 days in length. Also, the resulting lenses typically lack one or more desirable physical properties, such as impact strength, scratch resistance, heat resistance, and colorless transparency.

Conventional thermo-casting techniques require very long curing times, at least about 10 to 20 hours to cast finished (thin) lenses, and about 20 to 60 hours to produce optically acceptable semi-finished (thick) lenses. This low lens productivity requires a large inventory of the expensive glass molds that are used to cast the lenses. There is, therefore, a significant need for a process which will complete the curing in shorter periods of time.

A variety of researchers have developed processes and compositions which shorten the curing time by utilizing ultraviolet (UV) radiation as a driving force to carry out the polymerization reaction. Such processes typically employ a photosetting type resin such as di-functional acrylic monomer and a photoinitiator. The mixture is poured into a transparent mold having a desired optical surface, and thereafter the ultraviolet light is radiated to the resin through the transparent mold to cure the photosetting resin. Examples of such processes are illustrated by U.S. Pat. No. 4,166,088, U.S. Pat. No. 4,298,005, U.S. Pat. No. 4,728,469, U.S. Pat. No. 4,879,318, U.S. Pat. No. 4,919,850, U.S. Pat. No. 5,028,358, and published application WO92/12851. The disclosures of these references are hereby incorporated by reference.

Ultraviolet curing processes are advantageous because of the relatively short curing times, however, problems associated with discoloration, distortion and insufficient hardness are common. The most significant drawback is the striations that are caused by uneven curing and stress. It is known that these striations are the result of thermal gradients in the gel-state, which produce convection lines that become frozen in place and cannot be dispersed. The exothermic nature of the polymerization reaction, and the poor heat transfer of the glass casting mold, are the main cause of the problem. The striations are especially pronounced in thick lenses, where the amount of exothermic heat generated by the polymerization reaction is increased by the increased monomer volume. Efforts to use low temperature, low intensity, and evenly distributed ultraviolet light were largely unsuccessful for casting thick lenses. These processes are, therefore, mostly utilized for the casting of thin, finished prescription lenses.

Lipscomb et al., U.S. Pat. No. 4,879,318, discloses an alternating source of illumination, or the rotation of the reaction cell, to alternate the illumination and to thereby minimize overheating problems. Blum, U.S. Pat. No. 5,028,358, and Blum et al, U.S. Pat. No. 4,419,850, disclose rotation of the mold assembly. Japanese Patent Application Publication No. 3-193313 discloses the use of interrupted illumination to control the polymerization reaction. However, this process does not provide adequate means for determining the cycles of illumination, which will change with changing mold geometry and process characteristics.

It remains desirable to provide a process for the ultraviolet casting of lenses which is faster and more economical than those currently available, and yet which results in the production of high quality lenses which are substantially free of striations and distortions.

SUMMARY OF THE INVENTION

It is an object of the invention to provide a process and apparatus for manufacturing plastic lenses.

It is another object of the invention to provide a process to produce high optical quality plastic lenses, both finished and semi-finished, in a relatively short time.

It is still another object of this invention to provide a plastic lens that is clear, hard, tintable, processable, and has very little flexibility at high temperature.

It is a further object of the invention to efficiently produce a plastic lens having a refractive index higher than lenses made of DAC monomer.

These and other objects are provided by a process and apparatus for manufacturing plastic lenses in which lens forming materials comprising at least one liquid monomer and at least one photosensitive initiator are injected into a mold. The charged mold is subjected to ultraviolet light to effect polymerization and curing.

It was found that striation-free lenses can be successfully cast in short periods of time using ultraviolet light if the excess heat generated from the exothermic reaction is dissipated rapidly and spontaneously to avoid local heat build up, which frequently results in uneven curing. This requirement of controlling the exothermic reaction during casting has been accomplished by discontinuing the ultraviolet light exposure, as needed, to maintain constant temperature in the mold assembly, which in turn results in uniform curing.

The temperature of the forming lens is monitored, and the ultraviolet light is turned off when the temperature reaches a predetermined upper set point. The ultraviolet light is turned on again when the temperature falls to a predetermined lower set point. The time duration and the number of the on and off cycles are directly related to the exothermic heat produced by the reaction, which in turn varies with the size and geometry of the desired lens.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
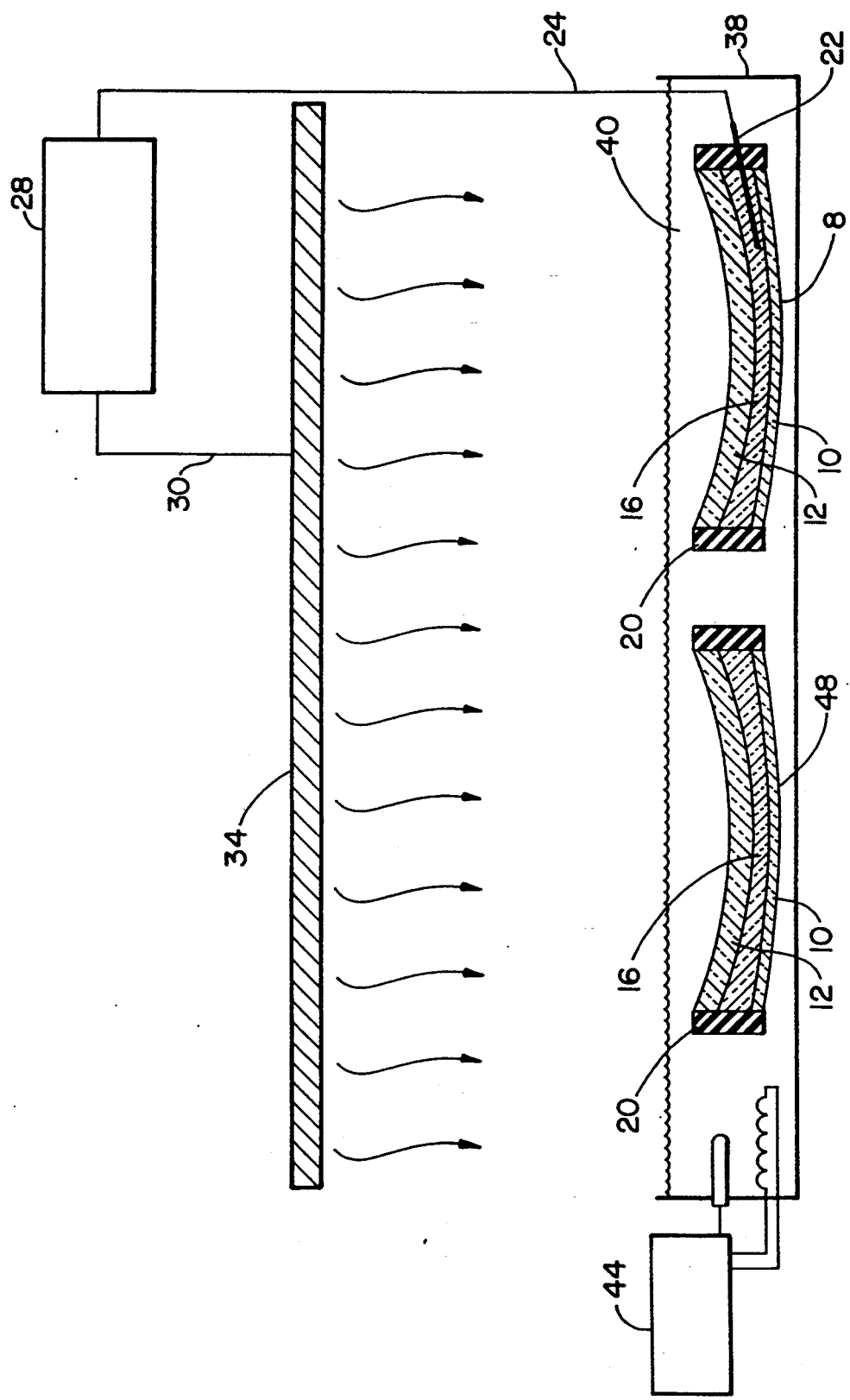
FIG. 1 is a schematic representation of apparatus according to a first embodiment of the invention.

According to the invention, lens forming materials comprising liquid monomers and at least one photosensitive initiator are injected into a mold and cooled. The lens forming materials are subjected to ultraviolet light to initiate polymerization and curing. The temperature of the lens forming materials is monitored, and the ultraviolet light is turned off when the temperature reaches a predetermined upper set point. The ultraviolet light is turned on again when the temperature reaches a predetermined lower set point.

Monomers suitable for the invention can be selected from many monomers known for this purpose. It is possible to utilize any UV-polymerizable monomer, such as epoxy monomers, which is capable of producing a lens with acceptable characteristics. It is currently preferred, however, that the liquid monomers comprise at least one ethylenic unsaturated compound having at least two unsaturated groups per molecule. It is most preferred that the liquid monomers further comprise at least one polythiol compound having at least two thiol groups per molecule.

Typical examples of the unsaturated ethylenic compounds include ethylene glycol dimethacrylate, propylene glycol dimethacrylate, trimethylene glycol dimethacrylate, tetramethylene glycol dimethacrylate, polyethylene glycol dimethacrylate, trimethylolpropane triacrylate, pentaerythritolpropane trimethacrylate, ethoxylated bisphenol A diacrylate, 1,6-hexanediol dimethacrylate, urethane diacrylate, epoxy diacrylate, diallyl phthalate, and divinyl benzene.

Examples of polythiol compounds include 1,2,3-trimethylolpropane tri(thioglycolate), pentaerythritol tetra(thioglycolate), pentaerythritol tetra(3-mercaptopropionate), 1,2,3-trimethylolpropane tri(3-mercaptopropionate), thioglycerol, dithioglycerol, trithioglycerol, dipentaerythritol hexa(2-mercapto acetate), and 3,4,5,6-tetrachloro-1,2-dimercapto benzene.

Many different ratios and proportions of desired monomers are possible for the monomeric system. According to a currently preferred monomeric system, the monomers comprise about 60 to 100% by weight of ethylenic unsaturated compound(s) having at least two unsaturated groups per molecule, about 0 to 40% by weight one or more polythiol compound(s) having at least two thiol groups per molecule, and between about 0.005 to 0.5% by weight photoinitiator.

The photoinitiator can be selected from several compounds known for this purpose. Currently preferred photoinitiators include 1-hydroxy-1-cyclohexyl phenyl ketone, 2-hydroxy-2,2-dimethyl acetophenone, 2,2-dimethoxy-2-phenyl acetophenone, benzoin, benzoin methyl ether, benzoin propyl ether, benzoin isobutyl ether, 2,4-dihydroxy benzophenone, benzophenone, benzil, and 2,4,6-trimethylbenzyl diphenyl phosphineoxide.

The amount of the polymerizable polythiol used in the present monomeric system is selected by taking into consideration the refractive index, the impact resistance, and the odor of the desired final product. If the polythiol comprises more than about 40% by weight of the total composition, a cured product which gives off offensive odors will sometimes result.

In addition to the unsaturated ethylenic compound, polythiol, and photoinitiator, the photopolymerizable composition may also optionally contain various other materials. Examples of such optional materials include monoethylenic or monothiol reactive diluent to adjust the viscosity or one of the other properties of the lens, mold release agents, dyes, oxidative stabilizers, and ultraviolet light absorbers. These and other ingredients may be employed in their customary amounts for their customary purposes.

According to known casting polymerization processes, the mold assembly for producing plastic lenses can include a pair of optical mold parts at least one of which is transparent to ultraviolet light. The two mold parts are spaced apart by a gasket or tape that completely circumscribes and seals the two molds.

The ultraviolet light used in the curing process can be selected from any suitable source, including low, medium or high pressure mercury lamps, laser, xenon, luminescence such as fluorescence or phosphorescence, and the like. The ultraviolet light source utilized for testing the invention was a fluorescence Spectroline Model XX-15A, made by the Spectronics Corporation of Westbury, N.Y. This light source generates most spectra output in the range between 340 and 380 nm.

The orientation of the mold assembly during the curing process can be with either one side or both sides of the mold facing an ultraviolet light source. Any spatial orientation of the mold is possible. In the preferred embodiment, the mold assembly is positioned so that the concave side of the lens forming material is in the upward position facing the ultraviolet light source. This permits any entrapped bubbles to migrate to the edge of the lens. Curing the lens with the concave side facing down causes any entrapped bubbles to migrate toward the center of the lens, such that the resulting lens will be defective.

To control the heat of the exothermic reaction during the initial stage of the curing process, the temperature of the lens forming materials is monitored with a suitable temperature sensing device. It is currently preferred to use thermocouples, although other temperature sensing devices, such as infrared sensors, are also possible. The temperature data is monitored and, when the temperature has increased to a predetermined upper set point, the ultraviolet light is turned off. The ultraviolet light is turned on when the temperature reaches a predetermined lower set point. In order to quickly and efficiently remove the exothermic heat, the lower set point temperature is preferably between about 0° to 15° C. The invention was tested with the lower set point temperature set at about 10° C., using a cooling water bath to lower the temperature of the lens forming materials. Although cooling was conducted in a water bath during testing, other media such as air or other fluids could be used to achieve the desired cooling effects.

The predetermined upper set point can range from between about 0.1° to 20° C., preferably about 1° to 5° C., above the predetermined lower set point. The preferable temperature difference between the lower set point and the upper set point depends primarily on the chemical composition of the monomeric system, and the geometry and thickness of the desired lens. It is currently preferred that the upper set point not exceed about 2° C. above the lower set point. In order to control the heat of the exothermic reaction regardless of the reaction rate or the geometry of the desired lens, the upper set point most preferably should not exceed about 1° C. above the lower set point.

It is possible to provide more than one temperature set point to adjust the UV exposure for different stages of the reaction. It is currently believed, however, that a single upper and lower set point will be adequate for most uses.

Continuous UV-curing can be used at the conclusion of the on/off ultraviolet light exposure cycle in order to speed up the overall curing time. The reaction at this stage of the reaction cycle does not generate heat at the same rate as at earlier stages of the reaction. The continuous UV exposure can be conducted at room temperature to finish the UV-curing process. Alternatively, the continuous UV-exposure can be conducted at an elevated temperature to further speed the curing process.

The process of the invention can be utilized for different lens thicknesses and curvatures. The on/off ultraviolet light cycle time can be recorded for each type of casting, so that the ultraviolet light curing cycle can be used in a large scale production environment for differing lenses without the need to monitor the temperature of the lens forming material in each mold. This is also necessary because the presence of the thermocouple to monitor the temperature will, in some cases, damage the resulting lens. Data is recorded which identifies the times at which the ultraviolet light is turned on and off during the progress of the reaction, and when different stages of the reaction have been completed. These predetermined timing cycles can be used to time the ultraviolet light cycles in later production runs without the need of monitoring the temperature in each mold. A bank of data can be derived which records the ultraviolet light timing cycles according to process characteristics such as lens type and size, lens forming materials, and mold type. This will allow the invention to be used to create lenses according to the invention as they are needed.

It is possible that non-invasive temperature monitoring techniques could be developed which would permit individual or batch monitoring of the temperature within the mold during actual production runs. Also, a reference mold could be utilized during a production run of lenses having the same or similar thickness, curvature and other characteristics. The thermocouple would be positioned in the reference mold to monitor and control the temperature in the production molds. Only the reference lens would be unusable.

The lenses can be subjected to thermal curing to complete the curing process and to establish the final lens geometry. Thermal curing is known in the art to improve the characteristics of a finished lens by relieving stress points in the lens. The thermal curing can be performed according to known methods, such as in an air oven, and preferably lasts for about one hour at between about 100° to 140° C., depending on the glass transition temperature (Tg) of the lens material.

Apparatus according to the invention comprises a water cooling bath, an ultraviolet light source, and a temperature sensing device connected to a programmable process controller that is adapted to turn on and turn off the ultraviolet light according to a comparison by the controller of the temperature with the upper set point and the lower set point.

There is shown is FIG. 1 a currently preferred apparatus according to the invention. A reference glass mold 8 comprises mold segments 10, 12. Lens forming materials 16 are sealed within the mold segments 10, 12 by a sealing gasket or tape 20. A thermocouple 22 or other temperature sensing device is connected by a lead 24 to a controller 28. The controller 28 is operable through a connection 30 to operate a UV-source 34 according to the temperature sensed by the thermocouple 22. The reference mold 8 can be positioned in a bath 38 filled with cooling liquid 40. A liquid heating/cooling control apparatus 44 is used to maintain the cooling liquid at a desired temperature.

A plurality of production molds 48 similar in construction to the reference cell 8 are filled with lens forming materials 16 and placed into the bath 38 with the reference cell 8. The temperature of the lens forming materials in the reference cell 8 is monitored and processed by the controller 28 to control the operation of the ultraviolet light 34, and to thereby also control the temperature of the lens forming materials in the production molds 48.

Figure 2:
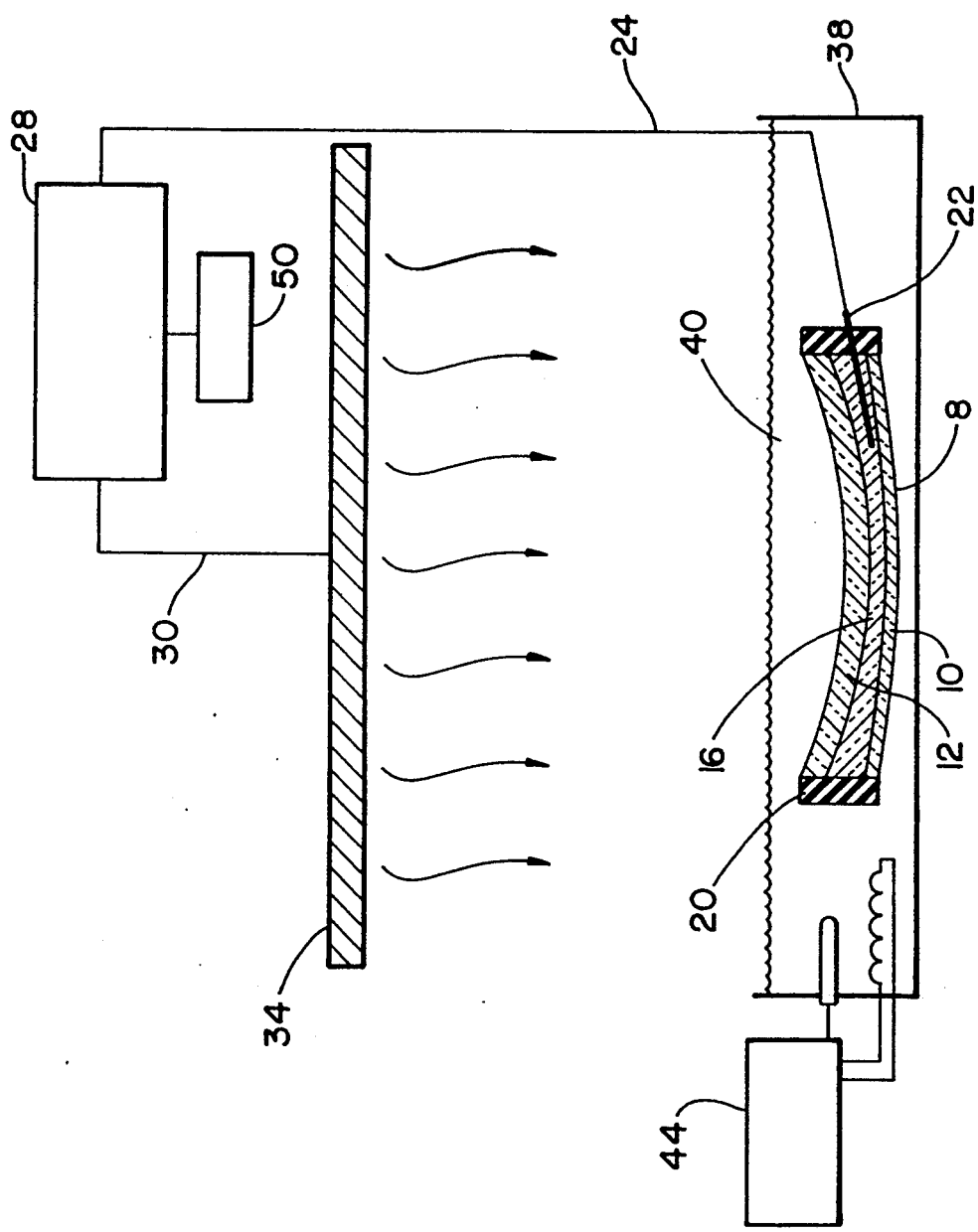
FIG. 2 is a schematic representation of apparatus according to a second embodiment of the invention.

An alternative apparatus according to the invention is shown in FIG. 2, where like numbers refer to like elements. The reference cell 8 is used to produce on/off cycle data that is recorded in a data storage device 50. The data storage device 50 can be connected to, or form a part of, the controller 28. This reference data is then utilized to produce lenses having the same or similar characteristics as the lens produced during the reference test.

EXAMPLES

The process of the invention was utilized to prepare plastic lenses. The ultraviolet light source was the Spectroline Fluorescence Model XX-15A. The mold assembly in each example consisted of a pair glass optical mold sections separated and sealed by rubber gaskets. All "parts" and percentages are based on weight unless otherwise indicated.

EXAMPLE 1

Trimethylolpropane triacrylate (40 parts), ethoxylated bisphenol A diacrylate (40 parts), pentaerythritol tetra(3-mercaptopropionate) (20 parts), and 1-hydroxycyclohexylphenyl ketone (0.01 parts) were mixed and the mixture was injected into the mold assembly. The mold assembly was cooled to 10° C. in a water cooling bath, and then subjected to the on/off ultraviolet light curing cycle. The programmable process control was programmed to turn on the ultraviolet light when the temperature of the lens forming material reached 10° C., and to turn off the ultraviolet light when the temperature reached 11° C. One hour was required to finish this on/off stage. The ultraviolet light exposure time was 15 minutes. The on/off stage was followed by continuous ultraviolet light exposure for 40 minutes. The lens was then thermally post cured in an air oven for one hour at 100° C. The completed lens had excellent optical quality, no striation or distortion, was colorless with a Barcol hardness of 40 shore D, and had a refractive index (nD) of 1.546.

EXAMPLE 2

Trimethylolpropane trimethacrylate (40 parts), a commercially available oligomeric mixture of epoxy acrylate and trimethylol propane trimethacrylate from Sartomer of West Chester, Pa., (40 parts), pentaerythritol tetra(3-mercaptopropionate) (20 parts), and 1-hydroxycyclohexylphenyl ketone (0.01 parts) were mixed and the mixture was injected into a mold assembly. The mold assembly was cooled to 10° C. in a water cooling bath, and then subjected to the on/off ultraviolet curing process. The processor was programmed to turn on the ultraviolet light when the temperature of the lens forming material reached 10° C., and to turn off the ultraviolet light when the temperature reached 11° C. Thirty-five minutes were required to finish this stage. The total ultraviolet light exposure time was 10 minutes. This stage was followed by a continuous ultraviolet light exposure for 50 minutes. The lens was then thermally post cured in an air oven for one hour at 100° C. The completed lens had excellent optical quality, no striation or distortion, was colorless with a Barcol hardness of 45 shore D, and had a refractive index (nD) of 1.541.

EXAMPLE 3

Trimethylolpropane triacrylate (61 parts), pentaerythritol tetra(3-mercaptopropionate) (39 parts), and 1-hydroxycyclohexylphenyl ketone (0.016 parts) were mixed and the mixture was injected into a mold assembly. The mold assembly was cooled to 10° C. in a water cooling bath. The mold assembly was then subjected to the on/off ultraviolet light exposure cycle. In this cycle the programmable process control was programmed to turn on the ultraviolet light when the temperature of the lens forming material reached 10° C., and to turn off the ultraviolet light when the temperature reached 11° C. The total time required to finish this stage was 20 minutes and the actual ultraviolet light exposure time was 8 minutes. The mold assembly was removed from the cooling bath and subjected to ultraviolet light continuously for 20 minutes. The lens was then thermally cured for one hour at 100° C. The cured colorless lens had no striations or distortions, had a Barcol hardness of 42 shore D, and had a refractive index (nD) of 1.524.

EXAMPLE 4

Epoxy acrylate/trimethylolpropane triacrylate oligomeric mixture from Sartomer (50 parts), phenoxyethyl acrylate (50 parts), and 1-hydroxycyclohexylphenyl ketone (0.07 parts) were mixed and the mixture was injected into a mold assembly. The mold assembly was cooled to 10° C. in a cooling water bath. The mold assembly was then subjected to the on/off ultraviolet light exposure cycle. In this cycle the programmable process control was programmed to turn on the ultraviolet light when the temperature of the lens forming material reached 10° C., and to turn off the ultraviolet light when the temperature reached 15° C. The total time required to finish this stage was 60 minutes and the actual ultraviolet light exposure time was 36 minutes. The mold assembly was removed from the cooling bath and subjected to ultraviolet light continuously for 29 minutes. The lens was then thermally cured for one hour at 100° C. The cured lens had no striation or distortion, had a Barcol hardness of 37 shore D, and had a refractive index (nD) of 1.559.

EXAMPLE 5

Example 1 was repeated using the same lens forming material, the same mold geometry, and the same ultraviolet light intensity, but without the on/off ultraviolet light exposure cycle of the invention, using instead the conventional continuous ultraviolet light exposure. The completed lenses were badly striated and distorted.

This invention is capable of many modifications which do not alter the essential attributes of the invention. Reference should, therefore, be had to the following claims, rather than to the foregoing specification, as indicating the scope of the invention:

We claim:

1. A process for casting plastic lenses which are substantially free of striations and distortions, comprising the steps of:
    a) injecting lens forming materials including at least one UV-polymerizable material into a mold and subjecting the lens forming materials to ultraviolet light;
    b) monitoring the temperature of the lens forming materials;
    c) turning off the ultraviolet light when the temperatures reaches an upper set point temperature; and,
    d) turning on the ultraviolet light when the temperature reaches a lower set point temperature, the ultraviolet light polymerizing the at least one UV-polymerizable material.

2. The process of claim 1, wherein said lens forming materials comprise at least one ethylenic unsaturated compound having at least two unsaturated groups per molecule.

3. The process of claim 2, wherein said lens forming materials comprise liquid monomers and at least one photosensitive initiator.

4. The process of claim 2, wherein said lens forming materials comprise a monomeric system comprising at least one ethylenic unsaturated compound having at least two unsaturated groups per molecule, at least one polythiol compound having at least two thiol groups per molecule, and at least one photosensitive initiator.

5. The process of claim 1, wherein said lens forming materials comprise between about 60 to 100% by weight ethylenic unsaturated compound having at least two unsaturated groups per molecule, between about 0 to 40% per weight polythiol compound having at least two thiol groups per molecule, and between about 0.005 to 0.5% per weight photosensitive initiator.

6. The process of claim 1, wherein said injecting step charges said lens forming materials between a pair of glass mold sections.

7. The process of claim 1, wherein, during said monitoring step said mold is placed in a cooling liquid bath having a temperature between about −10° to 30° C.

8. The process of claim 1, wherein after the ultraviolet curing steps c) and d), said lenses are subjected to thermal curing for between about 30 to 180 minutes at a temperature of between about 100° to 140° C.

9. The process of claim 1, wherein said lower temperature set-point is between about 0° to 15° C.

10. The process of claim 1, wherein said upper temperature set point is about 0.1° to 20° C. above the lower temperature set point.

11. The process of claim 1, wherein said upper temperature set point is between 1° to 5° C. above the lower temperature set point.

12. The process of claim 1, wherein said upper set point temperature is about 1° C. above said lower temperature set point.

13. Apparatus for casting plastic lenses which are substantially free of striations and distortions, comprising at least one mold for lens forming materials, an ultraviolet light for illuminating at least part of said mold, a cooling container for said mold, a temperature sensor for sensing the temperature of the lens forming materials in the mold, and a controller for comparing the temperature from the sensor to an upper set point temperature and to a lower set point temperature, the controller turning on the ultraviolet light when said temperature reaches the lower set point temperature and turning off the ultraviolet light when the temperature reaches the upper set point temperature.

14. The apparatus of claim 13, comprising at least one reference mold having said temperature sensor, and a plurality of production molds which do not have a temperature sensor.

15. The apparatus of claim 13, further comprising a data storage device to record UV on/off cycle data.

16. The apparatus of claim 13, wherein said cooling container is a cooling liquid bath.

17. A process for casting plastic lenses which are substantially free of striations and distortions, comprising the steps of:
   a) injecting lens forming materials including at least one UV-polymerizable material into at least one production mold and subjecting the lens forming materials to ultraviolet light;
   b) turning the ultraviolet light on and off at predetermined times, said predetermined times determined by:
      i) injecting other of said lens forming materials including at least one UV-polymerizable material into a reference mold and subjecting the lens forming materials to ultraviolet light;
      ii) monitoring the temperature of the lens forming materials in said reference mold;
      iii) turning off the ultraviolet light when the temperature in said reference mold reaches an upper set point temperature;
      iv) turning on the ultraviolet light when the temperature in said reference mold reaches a lower set point temperature; and
      v) using at least the times at which steps iii) and iv) are performed to control the ultraviolet light of step a), the ultraviolet light polymerizing the at least one UV-polymerizable material of step a).

18. A process for casting plastic lenses which are substantially free of striations and distortions, comprising the steps of:
   a) injecting lens forming materials including at least one UV-polymerizable material into a reference mold and subjecting the lens forming materials to ultraviolet light;
   b) turning the ultraviolet light on and off at predetermined times, said predetermined times determined by:
      i) monitoring the temperature of the lens forming materials in said reference mold;
      ii) turning off the ultraviolet light when the temperature in the reference mold reaches an upper set point temperature;
      iii) turning on the ultraviolet light when the temperature in the reference mold reaches a lower set point temperature; and
      iv) recording at least the times at which steps ii) and iii) are performed; and
   c) injecting lens forming materials including at least one UV-polymerizable material into at least one production mold and subjecting the lens forming materials to ultraviolet light by turning the ultraviolet light on and off using the times recorded in step b) iv), the ultraviolet light polymerizing the at least one UV-polymerizable material in the production mold.

* * * * *